(12) United States Patent
McQuinn (10) Patent No.: US 6,584,919 B2
(45) Date of Patent: Jul. 1, 2003

(54) ALL WHEEL STEER VARIABLE LOAD CARRYING TRACTOR VEHICLE

(75) Inventor: Alvin E. McQuinn, Bonita Springs, FL (US)

(73) Assignee: Agco Corporation, Duluth, GA (US)

( * ) Notice: Subject to any disclaimer, the term of this patent is extended or adjusted under 35 U.S.C. 154(b) by 0 days.

(21) Appl. No.: 10/099,358

(22) Filed: Mar. 15, 2002

(65) Prior Publication Data

US 2002/0088382 A1 Jul. 11, 2002

Related U.S. Application Data

(62) Division of application No. 09/814,317, filed on Mar. 21, 2001, now Pat. No. 6,394,011, which is a division of application No. 09/303,536, filed on Apr. 30, 1999, now Pat. No. 6,253,691.

(51) Int. Cl.[7] ............................................... A01C 15/00
(52) U.S. Cl. .......................... 111/118; 111/200; 111/925
(58) Field of Search .......................... 111/118, 119, 120, 111/129, 200, 925

(56) References Cited

U.S. PATENT DOCUMENTS

| | | | | |
|---|---|---|---|---|
| 3,610,169 A | * | 10/1971 | Shannon | |
| 4,515,311 A | * | 5/1985 | Takata | 239/172 |
| 4,630,773 A | * | 12/1986 | Ortlip | 239/1 |
| 5,220,876 A | * | 6/1993 | Monson et al. | 111/130 |
| 5,355,815 A | * | 10/1994 | Monson | 111/200 |
| 5,453,924 A | * | 9/1995 | Monson et al. | 364/131 |
| RE35,100 E | * | 11/1995 | Monson et al. | 111/130 |
| 5,689,418 A | * | 11/1997 | Monson | 364/420 |
| 5,751,576 A | * | 5/1998 | Monson | 364/188 |
| 5,757,640 A | * | 5/1998 | Monson | 364/131 |
| 5,870,686 A | * | 2/1999 | Monson | 701/1 |
| 5,887,491 A | * | 3/1999 | Monson et al. | 74/864.74 |

OTHER PUBLICATIONS

High Tech Farming Solution, 06–1998.*
www.agchem.com/products/3104indu.htm, Terra–Gator 3104, Nov. 17, 1998, 1–5.*

* cited by examiner

Primary Examiner—Christopher J. Novosad
(74) Attorney, Agent, or Firm—Troutman Sanders LLP; Wm. Brook Lafferty (57) ABSTRACT

An all wheel steer variable load carrying tractor vehicle which is particularly suited for towing crop input implements, the front section of which comprises a cab and engine the back section of which comprises several storage containers for carrying bulk crop inputs. The storage containers are releasably attached to the vehicle and can be changed based on the type of crop inputs applied and any implements towed by the vehicle. The vehicle is equipped with low impact tracks to increase maneuverability. The vehicle may also be equipped with a combination of high flotation tires or tracks to minimize soil compaction. A delivery system in combination with a control system coordinates the movement of the crop inputs from the vehicle to places located off the vehicle.

12 Claims, 6 Drawing Sheets

Fig. 4C
REAR STEERING

Fig. 4D
ALL-WHEEL STEERING

ALL WHEEL STEER VARIABLE LOAD CARRYING TRACTOR VEHICLE

CROSS-REFERENCE TO RELATED APPLICATION(S)

The present application is a divisional of U.S. patent application entitled All Wheel Steer Variable Load Carrying Tractor Vehicle, Ser. No. 09/814,317, filed Mar. 21, 2001, now U.S. Pat. No. 6,394,011, which in turn was a divisional of U.S. patent application entitled All Wheel Steer Variable Load Carrying Tractor Vehicle, Ser. No. 09/303,536, filed Apr. 30, 1999, now U.S. Pat. No. 6,253,691.

BACKGROUND OF THE INVENTION

This invention relates to a load carrying tractor type vehicle to be used in general and site specific farming operations. It has multiple uses and many different systems can be affixed to or towed by the vehicle, but it is particularly adaptable for carrying multiple crop inputs associated with fertilizing and planting crops. More particularly, this invention relates to a tractor vehicle with all wheel steering configured to carry a payload of multiple crop inputs where the crop input storage containers are replaceable and exchangeable, but may be permanently affixed in some unique situations to accommodate specific applications. The all wheel steering facilitates accurate row tracking, turning maneuverability, and minimizes side slippage of the vehicle or towed implements on a hill.

To improve efficiency, farmers are moving to larger implements in an attempt to combine operations in one pass and thus decrease the time and expense it takes to make several trips over the same field. Likewise, more than one implement may be towed so that still more crop inputs can be applied in one pass through the field. For example, a tractor vehicle used for planting seeds may tow a planting implement as well as a holding tank containing the seeds to be planted. If other crop inputs are applied during planting, additional storage containers or holding tanks are required to accommodate transporting those crop inputs, and must likewise be towed behind the tractor vehicle.

The increase in the size and number of implements towed behind tractors, as well as the need to increase the size of tractors so that they are able to pull the larger implements or combinations of them, leads to more destruction of the soil and more compaction. Soil compaction prevents moisture penetration, reduces fertilizer and chemical utilization, and hinders root growth. Thus, less soil compaction means higher yields and the fewer wheels or tracks that follow the tractor the better.

Another result of the increasing size and number of implements pulled behind a tractor vehicle is that more room is required at the end of the row for the vehicle and implements to turn around. When several crop inputs are applied requiring several holding tanks to be towed behind the tractor, much more area must be left at the end of the field for the tractor, implements, and tanks to turn around. This area used for turning may not be worked, and often must be covered in another pass around the perimeter of the field. When the turning radius of the vehicle and implements is large, it may take more than one perimeter pass to cover the unworked ground, which takes more time. A further problem with such a large turn radius is that it makes it more difficult to start the next row without missing some ground or overlapping ground already covered.

Time is also spent filling the crop input containers each time they are emptied. This may require a farmer to unload seed bags or otherwise keep a supply of crop inputs nearby for refilling the holding tanks as they become empty. This becomes even more time consuming when multiple crop inputs are applied at different rates, which may cause the farmer to stop and refill different crop inputs at different times, greatly slowing the application process.

Historically, farm tractors have been built with enough weight to allow for adequate traction relative to the farm implements to be pulled. Not enough weight meant wheel slippage and poor performance with its many undesirable and unacceptable negative characteristics. Because the tractors were designed to be heavy enough to achieve the desired traction, tractors did not have a load carrying platform for multiple crop inputs and large volumes of crop inputs. Adding a payload of crop inputs would simply make the tractors too heavy to be useful.

To further increase efficiency and compete in the global market, farmers are increasingly turning to high technology to help them plant, fertilize, and apply chemicals in a manner that reduces costs while increasing yields. Precision farming uses a global positioning system (GPS), site specific maps, and computer systems on board the tractor vehicle to aid a farmer in applying the precise amount of crop inputs required by the soil conditions of a particular point in a field. More sophisticated precision farming systems can coordinate the application of multiple crop inputs so that the correct prescriptive mix is applied as required by soil conditions for a particular point in a field.

Accordingly, there is a need in the farming industry for a load carrying tractor vehicle having appropriate weight distribution and steering capability to prevent row track side slippage of the tractor vehicle when operating on hillsides. Likewise, there is a need for a vehicle that can carry a large payload of multiple crop inputs which will not need to be refilled often and that can accommodate the application of multiple crop inputs while reducing soil compaction and turning radius. It is a significant improvement in the art for such a vehicle to be equipped with the latest technology for precision farming.

BRIEF SUMMARY OF THE INVENTION

The present invention answers the need in the agricultural industry for a tractor vehicle that operates on steep hills or grades without the rear of the vehicle slipping downhill, even when towing one or more implements or crop input storage devices or both. The invention reduces soil compaction and turning radius, and yet is able to apply multiple crop inputs in one pass. The present invention is an all wheel steering variable load carrying tractor vehicle capable of operating with a control system for coordinating application of multiple crop inputs consistent with site specific farming goals.

To make it easier to turn around and keep rows aligned, the vehicle has all wheel steering. Thus when traveling on hills, the rear of the vehicle can be steered so that it continues to follow the front of the vehicle, rather than slipping downhill. The all wheel steering likewise helps to turn the towing vehicle more sharply at the end of a row and make it possible to start the next row with little or no skips or overlaps. To further increase maneuverability, the vehicle may be articulated, and configured with articulated steering. It is also possible to have the vehicle articulated with both articulated steering and rear axle steering.

Towing a large load through a field can disrupt the soil, especially due to slippage on hillsides or in wet areas. This soil disruption is alleviated by moving the payload from behind to on the vehicle. The all wheel steering load carrying vehicle is fitted with multiple containers on the rear section of the vehicle, allowing the vehicle to carry a payload of multiple crop inputs. This eliminates much of the need for towing a separate crop input storage tank behind the vehicle. By eliminating at least one implement behind the vehicle, less soil compaction occurs with each pass through a field. To further reduce soil compaction, the towing vehicle is fitted with either high flotation tires or tracks.

The all wheel steer variable load carrying tractor vehicle is designed with less weight. In the past, tractor vehicles were designed to be heavy enough to achieve the desired traction. Since the tractor vehicles were already heavy, adding a payload for storing crop inputs would make the tractor too heavy for most farming uses. The present invention has smaller castings, a light weight extended frame, and other components that have been minimized to eliminate weight. This allows for installation of various combinations of application tanks and bins, which allow for the desired combination of crop inputs to fit the required farming application. This construction also allows the vehicle to transport a payload of multiple crop inputs onboard with no increase in soil compaction or soil disruption.

Since planter loads of seeds, fertilizer, and crop protection chemicals can be carried on the tractor vehicle, the quantity of inputs carried on the planter can be reduced or eliminated. This makes it possible to design and use planters that are easier to fold for road transportation because storage tanks may be unnecessary on the planter or drill. The variable load carrying tractor offers similar benefits when it is used to apply fertilizer, fertilizer in conjunction with crop protection chemicals, and any of many other various other crop input combinations.

The multiple containers carried on the rear section of the towing vehicle are removable and changeable. This increases the flexibility for farmers in that multiple crop inputs can be applied in one pass without needing to tow other implements. Likewise, farmers can choose the type of containers that best meet their needs based on the type of towed implement and the type of crop inputs to be applied. The containers can carry a combination of wet or dry or both crop inputs. The term crop inputs means, but is not limited to, seeds, fertilizers, including micronutrients, pesticides, including insecticides, herbicides, fungicides, and any other soil amendment or addition of any kind used to facilitate crop growth. Also included are specialty products, such as N serve, which does not directly affect the crop, but preserves nitrogen applied in anhydrous ammonia. The containers have a large capacity, which increases efficiency by eliminating the need to stop and refill implements which have a smaller capacity. Thus, farmers do not have to struggle with bags of seed or jugs of chemical.

DETAILED DESCRIPTION

Figure 1:
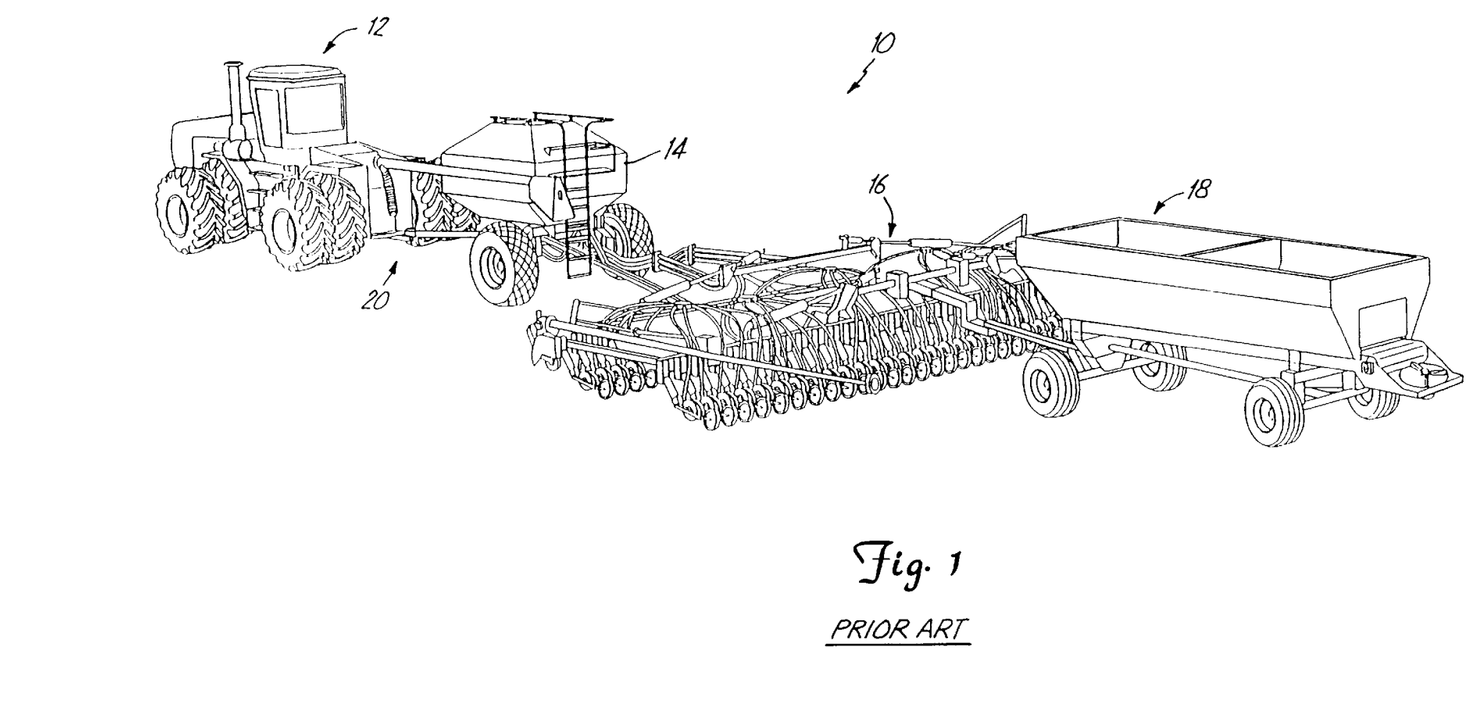
FIG. 1 is a perspective view of a prior art tractor having multiple towed crop input storage tanks and a crop input applicator implement attached to a three-point hitch.

FIG. 1 is a perspective view of a prior art crop input applicator system 10 including a tractor vehicle 12, a towed storage bin 14, a seeding implement 16, and a towed spreader 18. The towed storage bin 14 is attached to the tractor vehicle 12 by a three point hitch 20 in a manner well known to those skilled in the art. This system 10 is typical of site specific planting practices, where it is common to require simultaneous transportation of several crop inputs (seed, bulbs, fertilizer, herbicide, insecticides, and fungicides) and applicators (planters, spreaders, toolbars, and storage tanks) to achieve several operations in one pass. When on a steep hillside, the spreader 18, implement 16, and storage bin 14 tend to slip downhill, making the system 10 hard to control. In addition, the system 10 becomes very long in such a "mule train" set up, which requires a much larger turning radius. Likewise, the amount of soil compaction generated by the tractor 12, the storage bin 14, the implement 16, and the spreader 18 can be significant due to the number of tires that traverse the soil.

Figure 2:
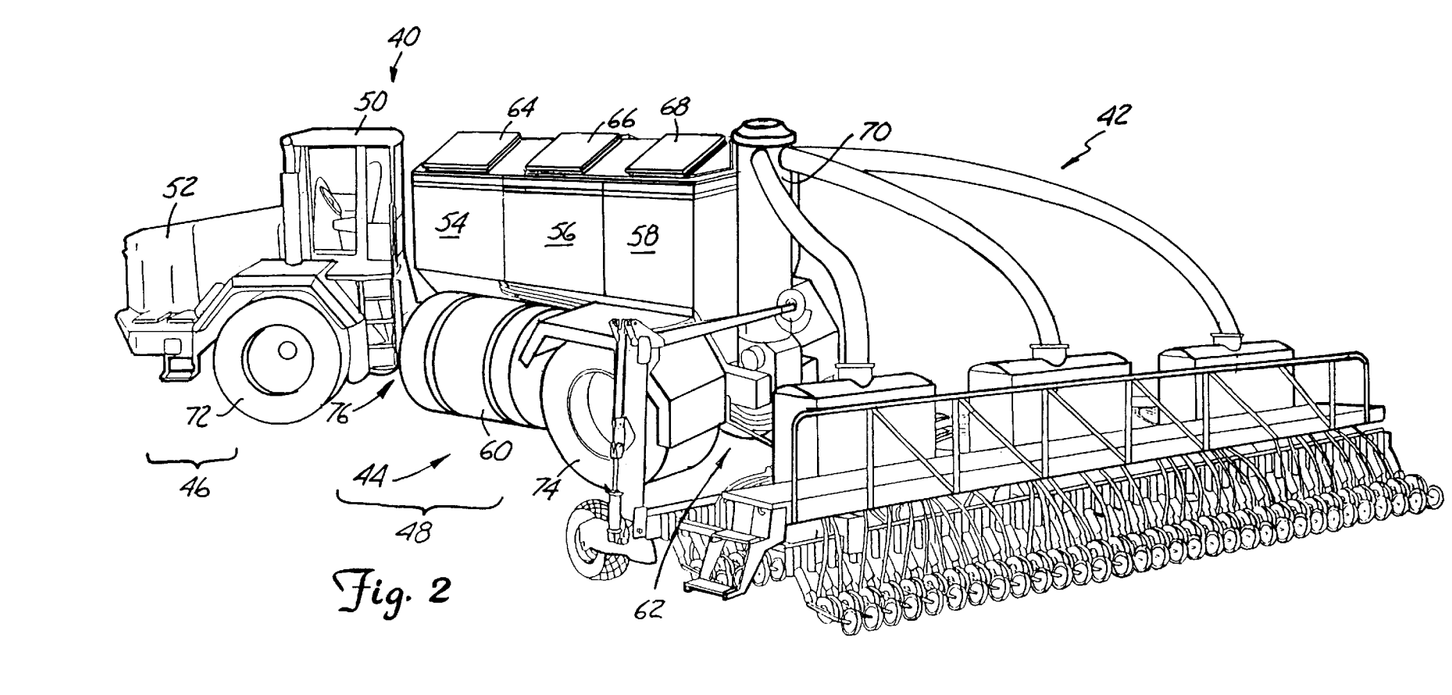
FIG. 2 is a perspective view of a variable load carrying towing vehicle with an articulated frame, a variable dry/wet payload system, and a towed crop input applicator.

FIG. 2 shows one embodiment of an all wheel steer variable load carrying vehicle 40 towing an accompanying crop input applicator 42. The vehicle 40 has an articulated frame 44 with a front section 46 and a rear section 48. The front section 46 carries the cab 50 and the engine compartment 52, which encloses the engine. The rear section 48 is longer than the front section 46 and is configured to selectively and removably carry dry crop input containers 54, 56, 58, and a wet crop input container 60. Also on the rear section 48 is a hitch 62. The vehicle 40 is designed to be lighter weight than conventional tractor vehicles so that when full, the containers 54–60 do not make the vehicle 40 so heavy as to be impractical for use. To achieve this, the vehicle 40 has smaller castings, an extended light weight frame 44, and other components that have been minimized to eliminate weight.

The extended light weight frame 44 is sized to allow for installation of the crop input storage containers 54–60. The weight of the containers 54–60 is greater than the weight of the frame 44 so that the containers 54–60 contribute the substantial portion of the total vehicle weight. The weight of the containers 54–60 gives the vehicle 40 enough traction to tow an accompanying applicator 42, even though the vehicle has a light weight frame 44. In addition, the containers 54–60 allow the farmer to assemble the desired combination of crop inputs to fit the required farming application. Thus, the farmer can determine which crop inputs need to be applied, select a crop input applicator 42 to be towed behind the vehicle 40, and configure the storage containers 54–60 on the vehicle 40 to match both the applicator 42 and type of crop inputs to be applied.

This configuration is a significant improvement over current tractors. Most tractor vehicles are designed to be heavy enough to achieve the desired traction necessary to tow a large implement through a field. Since the tractor vehicles are already heavy, adding a payload for storing crop inputs would make the tractor too heavy for most farming uses. Thus, the present invention is a significant improvement in the art.

Likewise, since planter loads of seeds, fertilizer, and crop protection chemicals can be carried on the tractor vehicle 40, the quantity of inputs carried on the planter can be reduced or eliminated. As a result, planters and drills that are easier to fold and easier to transportation down roads can be designed because the storage tanks are unnecessary. The variable load carrying tractor 40 offers similar benefits when it is used to apply fertilizer, fertilizer in conjunction with crop protection chemicals, and any of many other various other crop input combinations.

The variable payload towing vehicle 40 is capable of carrying several crop inputs in the containers 54–60. The dry containers 54, 56, and 58 are configured to hold dry crop inputs, such as seed, bulbs, granular fertilizer, and other types of dry fertilizer, herbicide, or insecticide. In addition to the dry containers 54, 56, and 58, the towing vehicle 40 is also configured with a side container 60 capable of holding wet crop inputs. The wet container 60 can be used for such things as liquid fertilizer, liquid herbicide, liquid insecticide, liquid fungicide, or other such liquid crop inputs. One of the major benefits of the variable payload vehicle 40 is its ability to carry large quantities of multiple crop inputs and dispense them to a towed crop input applicator 42. Because of this large capacity, the variable payload vehicle 40 is a significant improvement in the art in that it does not require a farmer to stop and struggle with bags of seed or jugs of chemical to maintain a full supply of multiple crop inputs on the applicator 42.

All the containers 54–60 on the rear section 48 are releasably attached to the frame 44. In this manner, the containers 54–60 are changeable and offer a farmer increased flexibility to vary containers 54–60 depending on the type of crop input applicator 42 used and the type of crop inputs being applied. Access to the dry containers 54, 56 and 58 is through container covers 64, 66, 68 where the crop inputs can be loaded. It is also possible to permanently attach the containers 54–60 to the frame 44. Likewise, it is possible to simply add weights to the vehicle 40 so that it can be used as a towing vehicle without filling the crop input storage containers 54–60. Adding weights will give the vehicle 40 the desired weight so that it has the needed traction.

The vehicle 40 is particularly suited to towing a crop input applicator 42. The hitch 62 makes it possible for a wide variety of types of crop input applicators 42 to be attached to the vehicle 40. Though the crop input applicator 42 shown in FIG. 2 is a type of planter, other types of applicators 42 may be used in connection with the towing vehicle 40, including other types of planters, drills, fertilizer applicators, toolbars, or similar implements. When towing a crop input applicator 42, the crop inputs stored in the containers 54–60 must be moved from the vehicle 40 to any towed applicator 42, and therefore, the towing vehicle 40 is equipped with a delivery system 70.

The delivery system 70 can be used to move crop inputs from the towing vehicle 40 to a towed crop input applicator 42, and it is also possible for the delivery system 70 to be used in the absence of a towed vehicle to dispense crop inputs directly from the vehicle 40 to the agricultural field. The delivery system 68 shown in the present embodiment is air assisted, however, other delivery systems are possible, such as a spreader, spray boom, or a combination thereof. To assure the vehicle 40 and any towed crop input applicator 42 are capable of working consistent with precision farming goals, the vehicle 40 may likewise be equipped with a control system and a locating system, such as a GPS receiver.

The towing vehicle 40 is designed to reduce soil compaction, and thus is equipped with high floatation tires 72 and 74. Other configurations assuring low impact on the soil include equipping the towing vehicle 40 with tracks or a combination of tracks and high flotation tires. Both high floatation tires and tracks are well known to those skilled in the art.

Figure 3:
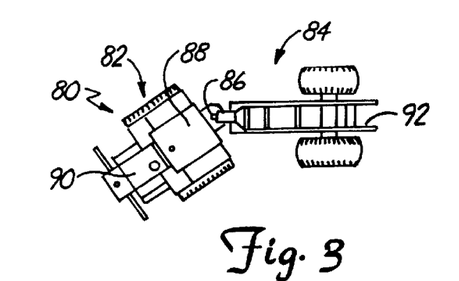
FIG. 3 is a top view of a variable load carrying towing vehicle with an articulated frame and a bare chassis.

The vehicle 40 shown in FIG. 2 is an articulated vehicle, having an articulated joint 76 connecting the front section 46 and the rear section 48. FIG. 3 is a more detailed view of an articulated variable load carrying tractor. FIG. 3 is a top view of a variable load carrying vehicle 80 more clearly illustrating how the front section 82 and rear section 84 are connected by an articulated joint 86. Cab 88 and engine 90 are illustrated on the front section 82. The rear section 84 is shown with no containers attached, but rather as the bare frame 92. The articulated joint 86 used between the front section 82 and rear section 84 is commonly known to those skill in the art. FIG. 3 illustrates how the articulated joint 86 acts as the pivot point for the towing vehicle 80.

As mentioned before, a common problem with large crop input systems is the difficulty in controlling the system on steep hillsides. The rear of the tractor vehicle, and the towed implement or implements, often tend to slip down the hillside, making it extremely difficult to accurately follow the rows without skips or overlaps. The present invention greatly alleviates this problem due to the steering system employed by the vehicle. FIGS. 4A–4D show top views of the towing vehicle 80 illustrating the vehicle's steering system.

Figure 4A:
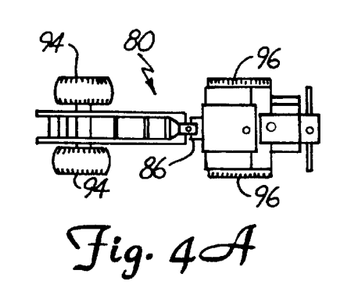
FIGS. 4A and 4B are top views of a variable load carrying vehicle with an articulated frame and illustrating articulated steering.
Figure 4B:
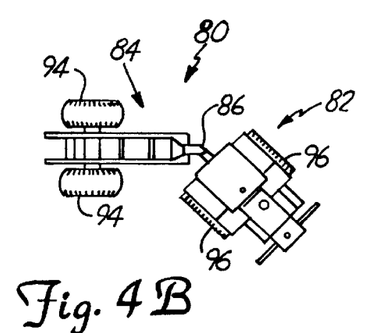

FIG. 4A shows an articulated variable payload towing vehicle 80 with articulated joint 86. FIG. 4A illustrates the position of the front wheels 94 and rear wheels 96 when the vehicle 80 is traveling in a straight line. As can be seen, the the rear wheels 94 follow directly behind the front wheels 96. FIG. 4B shows how the variable payload vehicle 80 is steered using articulated steering at the articulated joint 86. The joint 86 includes of a pair of actuators that pivot the joint allowing the front section 82 to move relative to the rear section 84. When using articulated steering as illustrated in FIG. 4B, neither the front wheels 96 nor the rear wheels 94 of the towing vehicle 80 are turned.

Figure 4C:
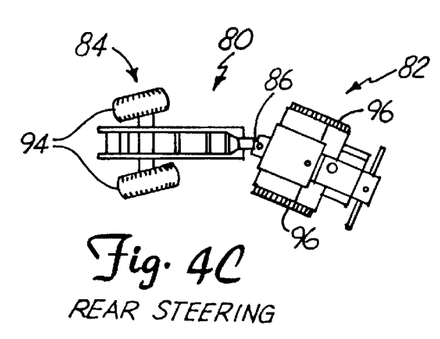
FIG. 4C is a top view of a variable load carrying vehicle with articulated steering and illustrating rear axle steering.

In contrast, FIG. 4C shows the articulated variable payload towing vehicle 80 with a rear steering system. As can be seen on FIG. 4C, the rear wheels 94 are steered as well as steering the articulated joint 86. The effect of the rear axle steering in FIG. 4C is for the front section 82 to be steered by the articulated joint 86 followed closely by the rear section 84 due to rear wheel 94 steering. In this manner, the rear section 84 can be controlled so that it follows the front section 82 more closely. Rear axle steering also helps to keep the rear section 84 aligned with the front section 82 on steep hillsides when normally the rear section 84, or any towed implement, slips downhill. Further, the rear wheel 94 steering allows the vehicle 80 to have a much tighter turning radius.

Figure 4D:
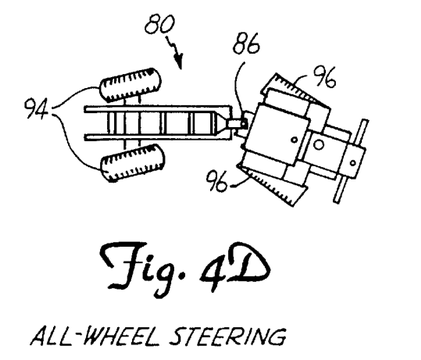
FIG. 4D is a top view of a variable load carrying vehicle with articulated steering and illustrating all wheel steering.

FIG. 4D shows yet another embodiment of a variable payload towing vehicle 80 with an articulated joint 86. In FIG. 4D, it is apparent that the rear wheels 94 are steerable as well as the front wheels 96. Having all wheels steerable further reduces the turning radius of the towing vehicle 80. All wheel steering increases the maneuverability of the towing vehicle 80 and can be used to offset any slippage experienced by the towing vehicle 80 or any towed implements when used on a hillside. As mentioned above, the rear wheels 94 and the front wheels 96 may be fitted with either high flotation tires, tracks, or a combination of both.

Figure 5A:
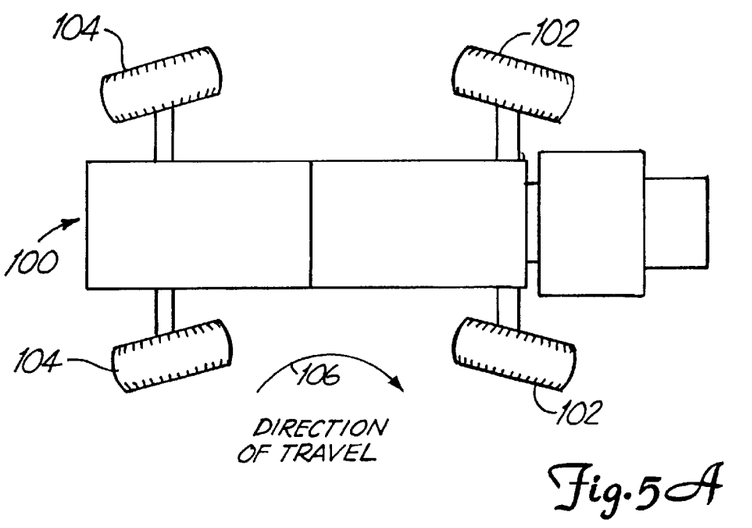
FIG. 5A is a top view of a non-articulated variable load carrying vehicle with all wheel steering.
Figure 5B:
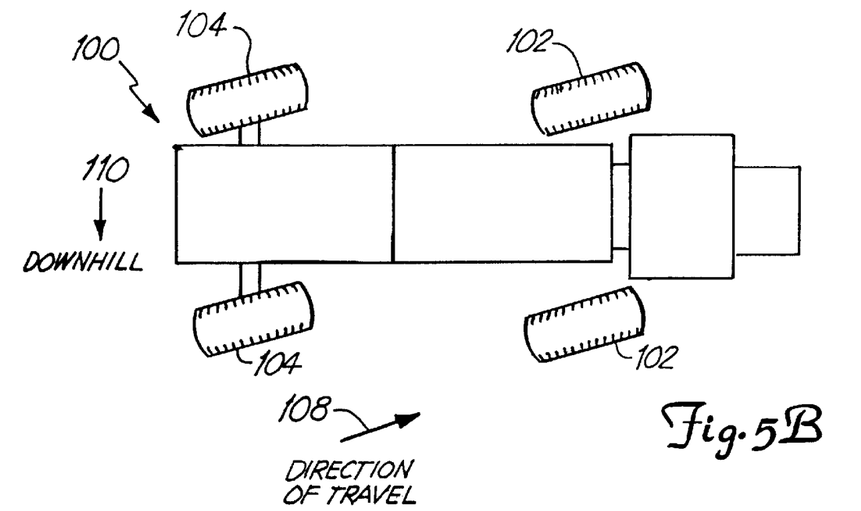
FIG. 5B is a top view of a non-articulated variable load carrying vehicle with all wheel steering commonly called crab steering.

Though the embodiments shown in FIGS. 2, 3, and 4A–4D all show the variable load carrying vehicle with an articulated frame, the present invention is not so limited. FIGS. 5A and 5B illustrate the present invention with a non-articulated frame configured with rear axle steering and all wheel steering (front and rear axle steering). FIG. 5A is a top view of a load carrying vehicle 100. The front wheels 102 and rear wheels 104 are both steerable allowing the vehicle 100 to make a tight turn. As the front wheels 102 turn the vehicle 100, the rear wheels 104 closely follow the path of the front wheels 102, moving the vehicle 100 in a circular path. The result of the configuration of the front 102 and rear 104 wheels is a direction of travel indicated by arrow 16.

FIG. 5B illustrates a variable load carrying vehicle 100 with all wheel steering. The vehicle 100 of FIG. 5B has front wheels 102 and rear wheels 104 both steered in the same direction. When so steered, the vehicle 100 moves in the direction of travel indicated by arrow 108. In such an instance, the rear wheels 104 do not follow in the same path as the front wheels 102. This steering configuration is sometimes referred to as crab steering. Crab steering as illustrated in FIG. 5B is particularly useful in a load carrying vehicle 100 because when towing implements on steep hillsides, the rear of the vehicle 100, as well as any towed implements, begins to slip downhill, in the direction indicated by arrow 110.

By steering the rear wheels 104, it is possible to react to this downhill slippage and keep the vehicle 100 aligned with the previous row. Without all wheel steering, the operator of a vehicle 100 towing an implement must continuously steer to compensate for the slippage of the vehicle 100 and implement downhill. First, the vehicle 100 must be turned uphill to compensate for the slippage. The resulting path of the vehicle 100 is a wavy path, since once the slippage has been compensated for, the vehicle 100 is often overlapping the previous row, and must be turned back downhill to align itself. Thus, the flexibility allowed from all wheel steering makes the vehicle 100 much more maneuverable on steep hillsides.

As illustrated in FIGS. 5A and 5B, the variable load carrying vehicle 100 is capable of more than one steering mode. Namely, the vehicle 100 can utilize the all wheel steering for turning, as shown in FIG. 5A, or for crab-like movement, as shown in FIG. 5B. Likewise, when the vehicle has an articulated joint, as shown in FIGS. 4A–4D, the vehicle has several steering modes. When articulated, the vehicle may have articulated steering only, articulated steering with front wheel steering, articulated steering with rear wheel steering, or articulated steering with all wheel steering. These very different steering modes are operator selectable from the cab of the vehicle. By making it possible for the operator of the vehicle to choose the appropriate steering mode based on current conditions, the operator has increased flexibility and maneuverability.

Figure 6A:
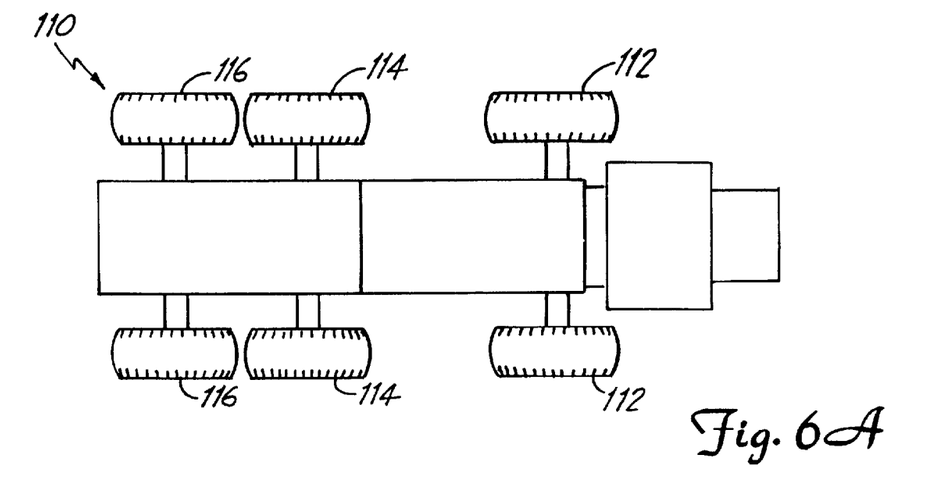
FIG. 6A is a top view of a variable load carrying vehicle with two front wheels and four rear wheels.
Figure 6B:
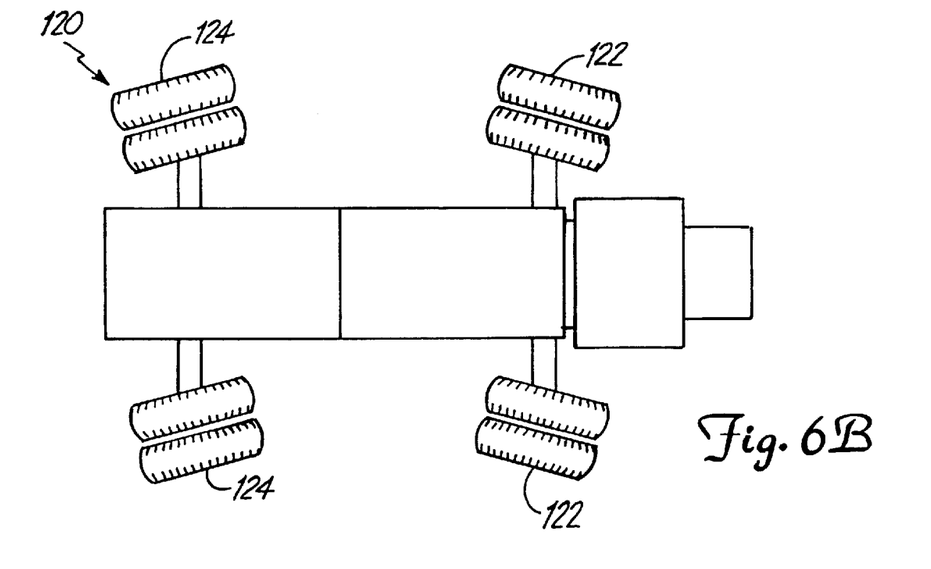
FIG. 6B is atop view of a variable load carrying vehicle with eight wheels; dual front and dual rear wheels.

Though the embodiments shown in FIGS. 2–5B all have four wheels, the variable load carrying vehicle may have a variety of wheel configurations; the vehicle may be four wheeled, six wheeled, or even eight wheeled. FIG. 6A shows a top view of a variable load carrying vehicle 110 with six wheels. The vehicle 110 has two front wheels 112, and four wheels 114, 116 on the rear of the vehicle. FIG. 6B shows a variable load carrying vehicle 120 equipped with eight wheels. The vehicle 120 has front dual wheels 122 and rear dual wheels 124. Other combinations of wheel configurations are also possible.

Figure 7A:
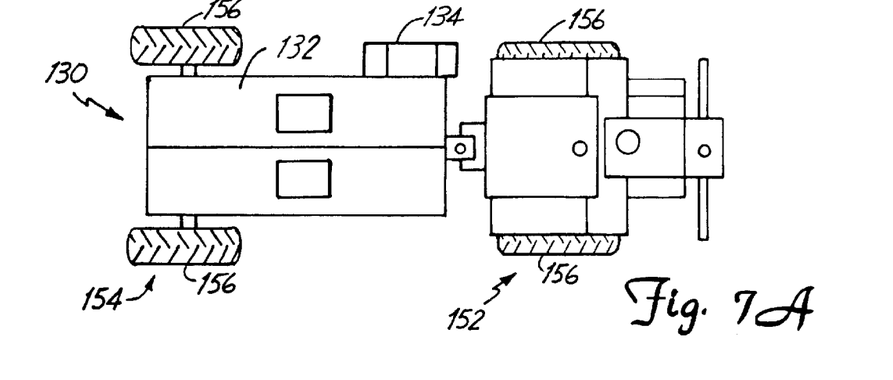
FIG. 7A is a top view of a variable load carrying vehicle illustrating a single bin capacity with a side wet tank.
Figure 7B:
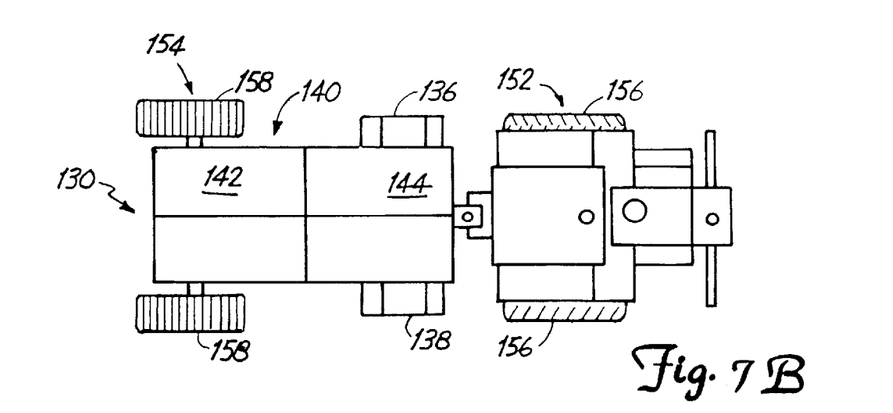
FIG. 7B is a top view of a variable load carrying vehicle illustrating a twin bin capacity with dual side wet tanks and rear tracks.

Though the embodiment shown in FIG. 2 illustrates three dry containers 48–52, and one wet container 56, it is possible for the vehicle to be configured with a different set of containers. For instance, FIG. 7A is a top view of a variable payload vehicle 130 showing that instead of containing three separate dry containers, the variable payload towing vehicle 130 is configured with one large container 132, and still carries one side tank 134 for wet crop inputs. In addition, as depicted in FIG. 7B, it is possible to operate the towing vehicle 130 with two wet tanks 136 and 138 and a twin bin 140 with a first compartment 142 and a second compartment 144 for dry crop inputs. Unlike the storage containers shown in FIGS. 2, the twin bin shown in FIG. 7B is not enclosed, allowing easy access from any point above the bins and eliminating a need for access covers. In still another configuration, FIG. 7C indicates a vehicle 130 without any wet tanks, but with three bins 136, 138, and 140 for dry crop inputs. It is also possible to mount an anhydrous ammonia tank on the frame.

Figure 7C:
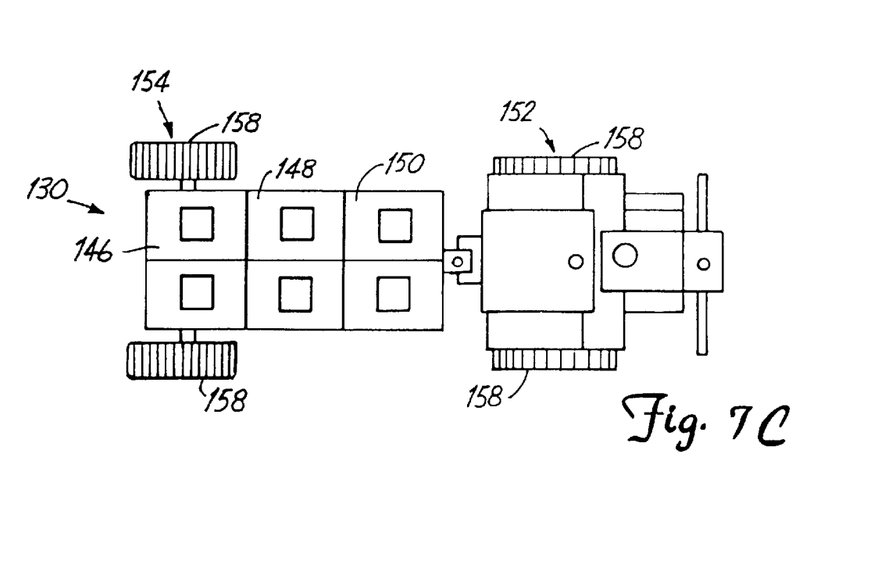
FIG. 7C is a top view of a variable payload vehicle illustrating a three bin capacity with no side wet tanks and front and rear tracks.

Also visible in FIGS. 7A–7C are different configurations of low impact ground engaging means comprising the front wheels 152 and the rear wheels 154. FIG. 7A shows a variable payload vehicle 130 with high flotation tires 156 on both the front wheels 152 and rear wheels 154. FIG. 7B shows a variable payload vehicle 130 with both tires 156 and tracks 158. In FIG. 7B, the vehicle 130 is equipped with high flotation tires 156 on the front wheels 152 and tracks 158 on the rear wheels 154. Another configuration is shown in FIG. 7C, where the vehicle 130 is equipped with tracks 158 on both the front wheels 152 and rear wheels 154. Other combinations of tires and tracks are also possible. For instance, when both tires 156 and tracks 158 are used on a vehicle it is most preferred to have tracks 158 on the rear wheels 154. It is also possible to have a combination of tires 156 and tracks 158 wherein the tracks 158 are placed on the front wheels 152 and the tires 156 are placed on the rear wheels 154.

Although the present invention has been described with reference to preferred embodiments, workers skilled in the art will recognize that changes may be made in form and detail without departing from the spirit and scope of the invention.

What is claimed is:

1. A load carrying towing vehicle, the vehicle comprising:
   a frame having a front portion carrying an engine and a cab, and a rear portion which is longer than the front portion and which is sized to receive crop input storage container means for carrying bulk crop input, wherein the weight of the container means is greater than the weight of the frame, such that the weight of the container means contributes a portion of total vehicle weight to provide the vehicle with traction for towing a crop input applicator;

a hitch for connecting the crop input applicator to the vehicle; and steerable front and rear ground engaging means and a steerable articulated joint supported by the frame, wherein the front and rear ground engaging means comprise a plurality of tracks.

2. The load carrying towing vehicle of claim 1 wherein the container means is sized to permit application of crop input to a field without a need for towing a crop input storage device.

3. The load carrying towing vehicle of claim 1 wherein the capacity of the crop input storage container means is greater than 50% of the total amount of crop input carried by the vehicle and the towed crop input applicator.

4. The load carrying towing vehicle of claim 1 wherein the container means holds dry bulk crop input.

5. A load carrying towing vehicle, the vehicle comprising:

a frame having a front portion carrying an engine and cab, and having a rear portion which is longer than the front portion;

a plurality of crop input storage containers for carrying bulk crop inputs removably attached to the rear portion of the frame, wherein the containers contribute a portion of total vehicle weight to provide the vehicle with traction for towing a crop input applicator; and a steerable rear ground engaging means and steerable front ground engaging means, wherein the steerable front and rear ground engaging means comprise a plurality of tracks.

6. The load carrying towing vehicle of claim 5 wherein the capacity of the crop input storage containers is greater than 50% of the total weight of crop inputs carried by the storage containers on the vehicle and the towed crop input applicator.

7. The load carrying towing vehicle of claim 5 wherein the frame is sized to provide space for receiving the plurality of load carrying crop input storage containers.

8. The load carrying towing vehicle of claim 5 wherein the weight of the containers is greater than the weight of the frame.

9. The load carrying towing vehicle of claim 5 wherein the crop input storage containers are sized to permit application of crop inputs to a field without a need for towing a crop input storage device.

10. The load carrying towing vehicle of claim 5 wherein at least one of the plurality of containers holds dry bulk crop input.

11. The load carrying towing vehicle of claim 5 and further comprising an articulated joint supported by the frame.

12. The load carrying towing vehicle of claim 5 wherein the crop input storage containers removably attached to the rear portion of the frame comprise interchangeable top mounted bins.

* * * * *